(12) United States Patent
Vanneman et al.

(10) Patent No.: US 8,848,180 B1
(45) Date of Patent: Sep. 30, 2014

(54) REFERENCE SYSTEMS FOR INDICATING SLOPE AND ALIGNMENT AND RELATED DEVICES, SYSTEMS, AND METHODS

(71) Applicant: Laserline Manufacturing, Inc., Redmond, OR (US)

(72) Inventors: Robert W. Vanneman, Bend, OR (US); Timothy A. Treichler, Redmond, OR (US)

(73) Assignee: Laserline Mfg., Inc., Redmond, OR (US)

( * ) Notice: Subject to any disclaimer, the term of this patent is extended or adjusted under 35 U.S.C. 154(b) by 0 days.

(21) Appl. No.: 14/019,459

(22) Filed: Sep. 5, 2013

(51) Int. Cl.
*G01C 1/00* (2006.01)
*G01C 15/00* (2006.01)

(52) U.S. Cl.
CPC ............ *G01C 15/002* (2013.01); *G01C 15/006* (2013.01); *G01C 15/008* (2013.01)
USPC ...................................... 356/139.05; 356/138

(58) Field of Classification Search
CPC ... G01C 15/006; G01C 15/008; G01C 15/002
See application file for complete search history.

(56) References Cited

U.S. PATENT DOCUMENTS

| | | | |
|---|---|---|---|
| 3,631,601 A * | 1/1972 | McNulty ........................ | 33/228 |
| 4,251,819 A | 2/1981 | Vickland | |
| 4,751,382 A | 6/1988 | Reifel et al. | |
| 4,907,915 A | 3/1990 | Nicholson et al. | |
| 5,287,627 A | 2/1994 | Rando | |
| 5,548,397 A | 8/1996 | Kool et al. | |
| 5,610,711 A | 3/1997 | Rando | |
| 5,612,781 A | 3/1997 | Ohtomo et al. | |
| 5,771,978 A * | 6/1998 | Davidson et al. ............ | 356/3.12 |
| 6,016,455 A * | 1/2000 | Ohtomo et al. ................. | 356/73 |
| 6,493,067 B1 | 12/2002 | Kodaira et al. | |
| 6,941,665 B1 * | 9/2005 | Budrow et al. ................. | 33/286 |
| 6,947,820 B2 * | 9/2005 | Ohtomo et al. ............. | 356/3.09 |
| 7,022,962 B2 | 4/2006 | Ohtomo et al. | |

(Continued)

FOREIGN PATENT DOCUMENTS

| | | |
|---|---|---|
| CN | 202582530 U | 12/2012 |
| JP | 2001289634 A | 10/2001 |

OTHER PUBLICATIONS

Geo-Laser, "Operating Instructions" for "Automatic-Drifting Laser VL-70/-80" (retrieved from the Internet in Jan. 2013).

(Continued)

*Primary Examiner* — Tarifur Chowdhury
*Assistant Examiner* — Juan D Valentin, II
(74) *Attorney, Agent, or Firm* — Perkins Coie LLP

(57) ABSTRACT

A reference system configured in accordance with a particular embodiment includes a light-emitting device having a first light emitter, a second light emitter, and a housing. The housing includes a base operably connected to the first and second light emitters. The first light emitter is configured to emit a planar light region having a vertical orientation. The second light emitter is configured to emit an indicator light beam. A slope of the indicator light beam is adjustable to change a position of the indicator light beam within a vertical adjustment field. The system further includes a controller configured to cause the first and second light emitters to rotate in concert relative to the base about a vertical axis so as to rotationally reposition the planar light region and the indicator light beam in response to a detected misalignment of the planar light region.

15 Claims, 10 Drawing Sheets

(56) References Cited

U.S. PATENT DOCUMENTS

| | | |
|---|---|---|
| 7,042,555 B1 | 5/2006 | Lawson |
| 7,215,420 B2 | 5/2007 | Gellerman et al. |
| 7,266,897 B2 * | 9/2007 | Treichler et al. ............... 33/286 |
| 7,304,729 B2 | 12/2007 | Yasutomi et al. |
| 7,506,452 B1 | 3/2009 | Vanneman et al. |
| 7,916,279 B2 | 3/2011 | Shinozaki et al. |
| 8,205,360 B1 | 6/2012 | Vanneman et al. |
| 8,684,632 B2 | 4/2014 | Grover |
| 2003/0101606 A1 | 6/2003 | Li |
| 2003/0137658 A1 | 7/2003 | Ohtomo et al. |
| 2010/0092247 A1 | 4/2010 | Hecht et al. |
| 2012/0203502 A1 | 8/2012 | Hayes et al. |
| 2013/0003037 A1 | 1/2013 | Nau |

OTHER PUBLICATIONS

Geo-Fennel, "Laser Measuring Tools and Surveying Equipment" (retrieved from the Internet in Mar. 2012).

Topcon, "Instruction Manual" for "Rotating Laser RT-5SW" (retrieved from the Internet in Jan. 2013).

* cited by examiner

REFERENCE SYSTEMS FOR INDICATING SLOPE AND ALIGNMENT AND RELATED DEVICES, SYSTEMS, AND METHODS

TECHNICAL FIELD

The present technology is related to reference systems for indicating slope and alignment. In particular, at least some embodiments are related to reference systems including light emitters that project light onto surfaces to create visible references for use in construction, surveying, and other applications.

BACKGROUND

In many construction, surveying, and other applications it can be useful to create a visible reference that has a selected deviation from horizontal (i.e., "slope" or "grade") and a selected horizontal orientation off a vertical axis (i.e., "alignment," "line," or "heading"). For example, in tunneling applications, individual tunnel sections are often formed with a selected slope and alignment so that an overall run of tunnel will follow a desired course. Similarly, individual pipe sections in pipe-ramming applications are often formed with a selected slope and alignment. During construction of a tunnel, a pipe, or a similar structure, a visible reference can be used to guide certain operations (e.g., steering a tunnel-boring machine, aiming a pipe-ramming assembly, etc.) so as to maintain a selected slope and alignment. One conventional approach to creating this visible reference includes positioning a light emitter directly above or below a first alignment reference point, manually adjusting the alignment of a light beam generated by the light emitter so that the light beam intersects a second alignment reference point corresponding to a given alignment relative to the first alignment reference point, and then manually adjusting the slope of the light beam to a selected slope. Thereafter, the light emitter automatically maintains the light beam at the selected slope, but operates independently of the alignment of the light beam. Based on the initial calibration, the light beam is assumed to represent the given alignment. This approach and other conventional approaches to indicating slope and alignment have certain limitations and/or disadvantages. Accordingly, there is a need for further innovation in this field.

BRIEF DESCRIPTION OF THE DRAWINGS

Many aspects of the present disclosure can be better understood with reference to the following drawings. The components in the drawings are not necessarily to scale. Instead, emphasis is placed on clearly illustrating the principles of the present technology. For ease of reference, throughout this disclosure identical reference numbers may be used to identify identical or at least generally similar or analogous components or features.

DETAILED DESCRIPTION

Figure 1:
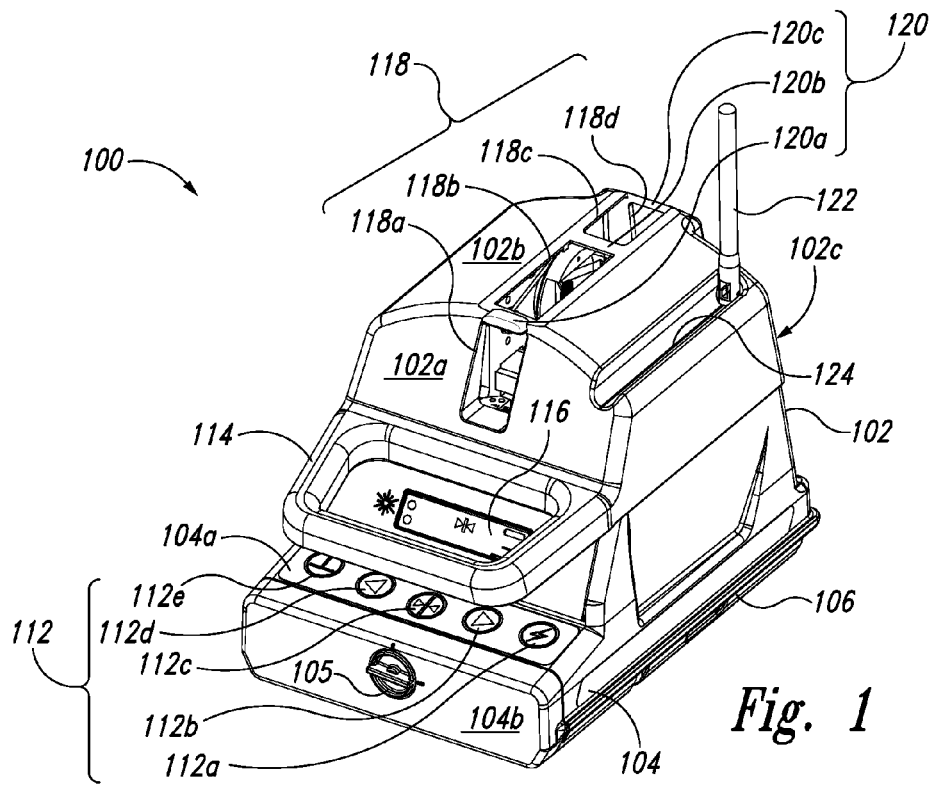
FIG. 1 is a perspective view from the top and one side illustrating a light-emitting device of a reference system configured in accordance with an embodiment of the present technology.

Specific details of several embodiments of the present technology are disclosed herein with reference to FIGS. 1-17. Although the embodiments are disclosed herein primarily with respect to tunneling and pipe-ramming applications, other applications and other embodiments in addition to those disclosed herein are within the scope of the present technology. For example, reference systems configured in accordance with at least some embodiments of the present technology can be used for building layout or for positioning elevated structures (e.g., elevated tracks or pipes) along specific courses above grade. It should be noted that embodiments of the present technology can have different configurations, components, features, or procedures than those shown or described herein. Moreover, a person of ordinary skill in the art will understand that embodiments of the present technology can have configurations, components, features, or procedures in addition to those shown or described herein and that these and other embodiments can be without several of the configurations, components, features, or procedures shown or described herein without deviating from the present technology.

Any given slope has a fixed angle relative to a level plane. Thus, a reference system including a light emitter that generates a light beam at a selected slope can automatically maintain the light beam at the selected slope by automatically leveling the light emitter. In this way, many conventional reference systems are capable of reliably indicating slope without the need for frequent monitoring or adjustment. Unfortunately, reliably indicating alignment is not as straightforward. A variety of factors can cause alignment to shift after a light emitter is initially calibrated. These factors include thermal expansion or contraction of a mount to which a light emitter is attached, thermal expansion or contraction of internal components of a light emitter, vibration of a light emitter, impact against a light emitter, and handling of a light emitter, among other examples.

Uncertainty regarding the accuracy of a reference indicating slope and alignment can reduce productivity, cause costly errors, or have other disadvantages. For example, when this accuracy is in doubt, personnel may find it prudent to manually recalibrate the reference just before key measurements are taken. In addition to being impractical, this still does not assure that alignment errors will not occur, since alignment shifts can occur after recalibration. Furthermore, manual recalibrations may be executed in haste, which may lead to calibration errors. In at least some cases, calibration errors tend to be magnified over long distances. For example, when a conventional light emitter is positioned in a subterranean pit (e.g., in a tunneling or pipe-ramming application), the length of the pit may limit the available distance between alignment reference points. Extrapolating an alignment calibrated using the alignment reference points to the end of a run of tunnel or pipe magnifies any calibration errors. Even a relatively small calibration error that may be difficult to detect at an alignment reference point may translate into a relatively large error at the end of a run of tunnel or pipe. In a particular example, a 0.5 inch calibration error at 50 feet near the top edge of a pit is magnified ten times along a 500 foot run of tunnel or pipe to cause a 5 inch misalignment at the end of the run of tunnel or pipe. This level of inaccuracy is often unacceptable or at least highly undesirable in modern construction applications.

Reference systems configured in accordance with at least some embodiments of the present technology can at least partially address one or more of the problems discussed above and/or other problems associated with conventional technologies whether or not stated herein. For example, reference systems configured in accordance with at least some embodiments of the present technology can have one or more features that reduce or eliminate inaccurate indications of alignment without necessitating frequent monitoring and/or manual adjustment. In a particular example, a reference system configured in accordance with an embodiment of the present technology includes a light-emitting device configured to communicate with a detector positioned at an alignment reference point. A light emitter of the light-emitting device can be configured to emit a planar light region having a vertical orientation or a scanning light beam having a vertical scanning field. The planar light region or the scanning light beam can interact with the detector. For example, when the planar light region or the vertical scanning field is shifted out of alignment (e.g., due to one of the factors discussed above), the detector can transmit a signal to the light-emitting device (e.g., via a controller) that causes the light-emitting device to automatically make one or more suitable adjustments to at least partially compensate for the shift. Accordingly, once the light-emitting device and the detector are initially positioned and activated, the reference system can be safely relied upon to accurately indicate alignment. This advantage and others are further discussed below with reference to FIGS. 1-17.

Selected Examples of Light-Emitting Devices

Figure 2:
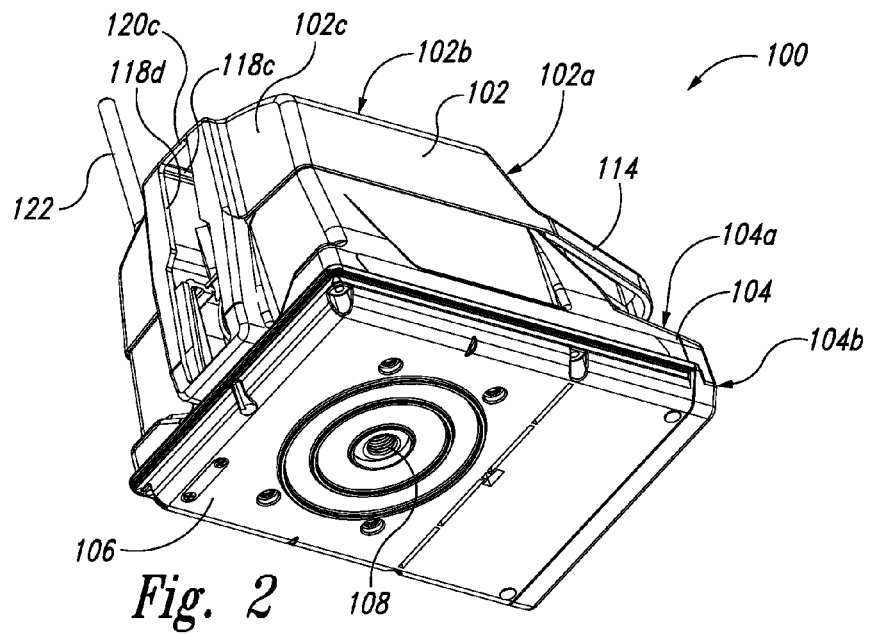
FIG. 2 is a perspective view from the bottom and one side of the light-emitting device shown in FIG. 1.
Figure 3:
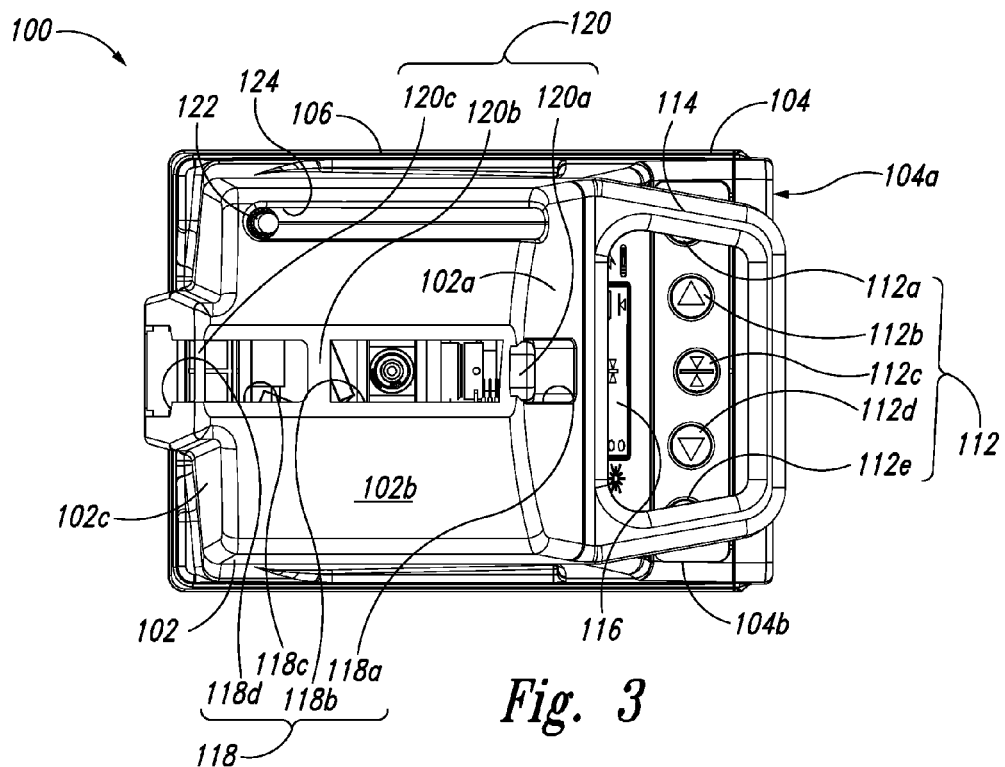
FIG. 3 is a plan view of the light-emitting device shown in FIG. 1.
Figure 4:
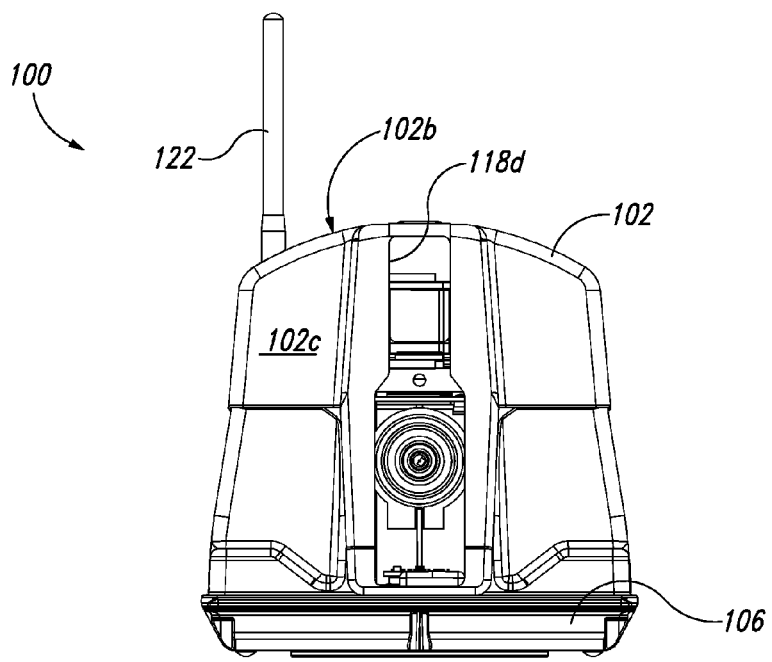
FIG. 4 is a front profile view of the light-emitting device shown in FIG. 1.
Figure 5:
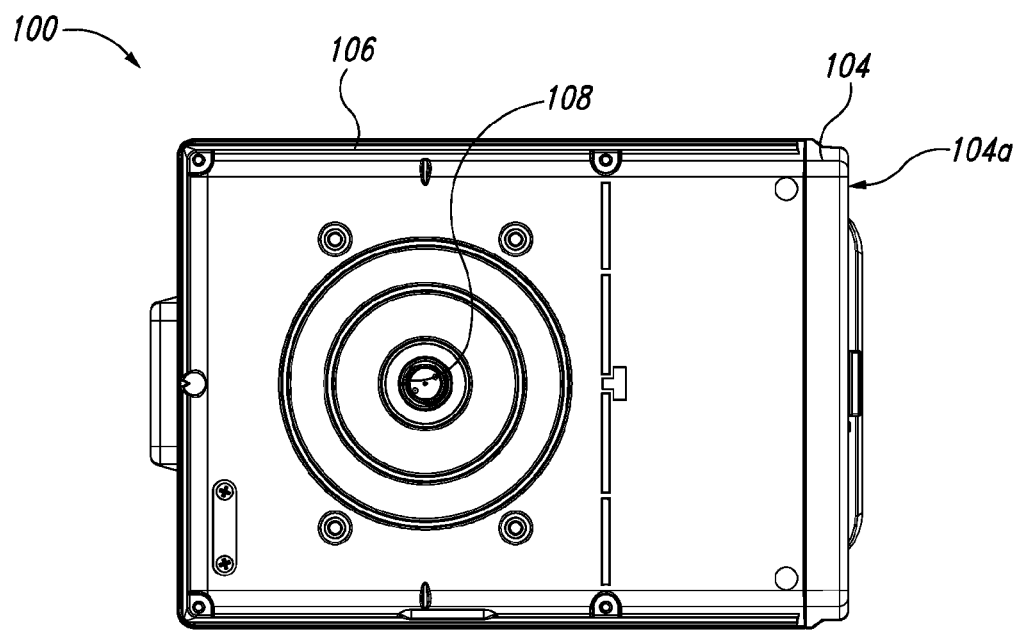
FIG. 5 is an inverse plan view of the light-emitting device shown in FIG. 1.
Figure 6:
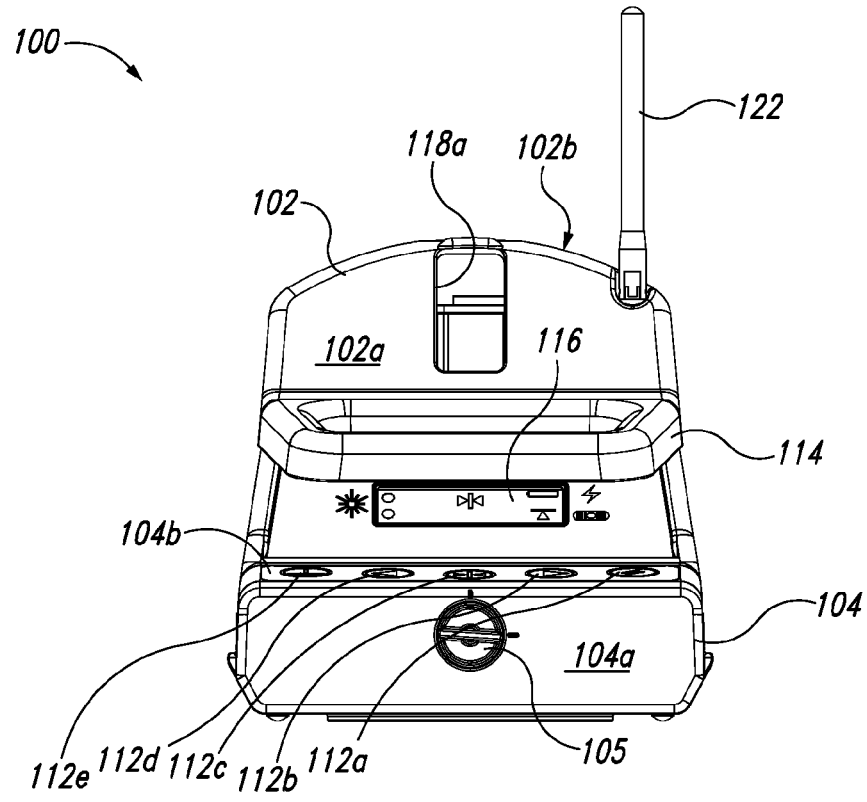
FIG. 6 is a rear profile view of the light-emitting device shown in FIG. 1.

FIGS. 1 and 2 are perspective views illustrating a light-emitting device 100 of a reference system configured in accordance with an embodiment of the present technology. FIGS. 3, 4, 5 and 6 are a plan view, a front elevation view, an inverse plan view, and a rear elevation view, respectively, of the light-emitting device 100. With reference to FIGS. 1-6 together, the light-emitting device 100 can include a housing 102 and a battery compartment 104 extending rearwardly from the housing 102. An interior of the battery compartment 104 can be accessed, for example, by removing a circular cap 105 positioned at a rear surface 104a of the battery compartment 104. The housing 102 can include a base 106 configured for attachment to a tripod (not shown) or another suitable support structure. For example, the base 106 can include a threaded recess 108 configured to receive a threaded protrusion of a tripod mounting head.

Along an upper surface 104b of the battery compartment 104, the light-emitting device 100 can include buttons 112 (individually identified 112a-112e) or other suitable user-interface elements configured to allow a user to control certain operations of the light-emitting device 100. In addition or alternatively, one of more of the buttons 112 can be configured to allow a user to control certain operations of one or more other components of the system, such as via a wireless or wired connection between the light-emitting device 100 and the one or more other components. The light-emitting device 100 can further include a handle 114 extending rearwardly from a rear surface 102a of the housing 102 such that the handle 114 has a position above and vertically spaced apart from the battery compartment 104. Below the handle 114 and above the battery compartment 104, the light-emitting device 100 can include a rearwardly facing display 116 configured to convey settings, status indicators, and/or other information to a user.

A row of windows 118 (individually identified as 118a-d) and intervening bridges 120 (individually identified as 120a-c) can extend along the rear surface 102a of the housing 102 above the handle 114, along an upper surface 102b of the housing 102, and along a front surface 102c of the housing 102. In some embodiments, a single window 118d extends from a bridge 120c at a corner between the upper surface 102b of the housing 102 and the front surface 102c of the housing 102 to a portion of the front surface 102c of the housing 102 at least proximate to the base 106. In other embodiments, the window 118d can extend to another suitable portion of the front surface 102c of the housing 102. The light-emitting device 100 can further include an antenna 122 and a groove 124 configured to receive the antenna 122 when the antenna 122 is in a stowed state. The groove 124 can be laterally spaced apart from and longitudinally aligned with a portion of the row of windows 118 and intervening bridges 120 extending along the upper surface 102b of the housing 102. The antenna 122 can be hingedly connected to the housing 102 at a forwardmost portion of the groove 124.

Figure 7:
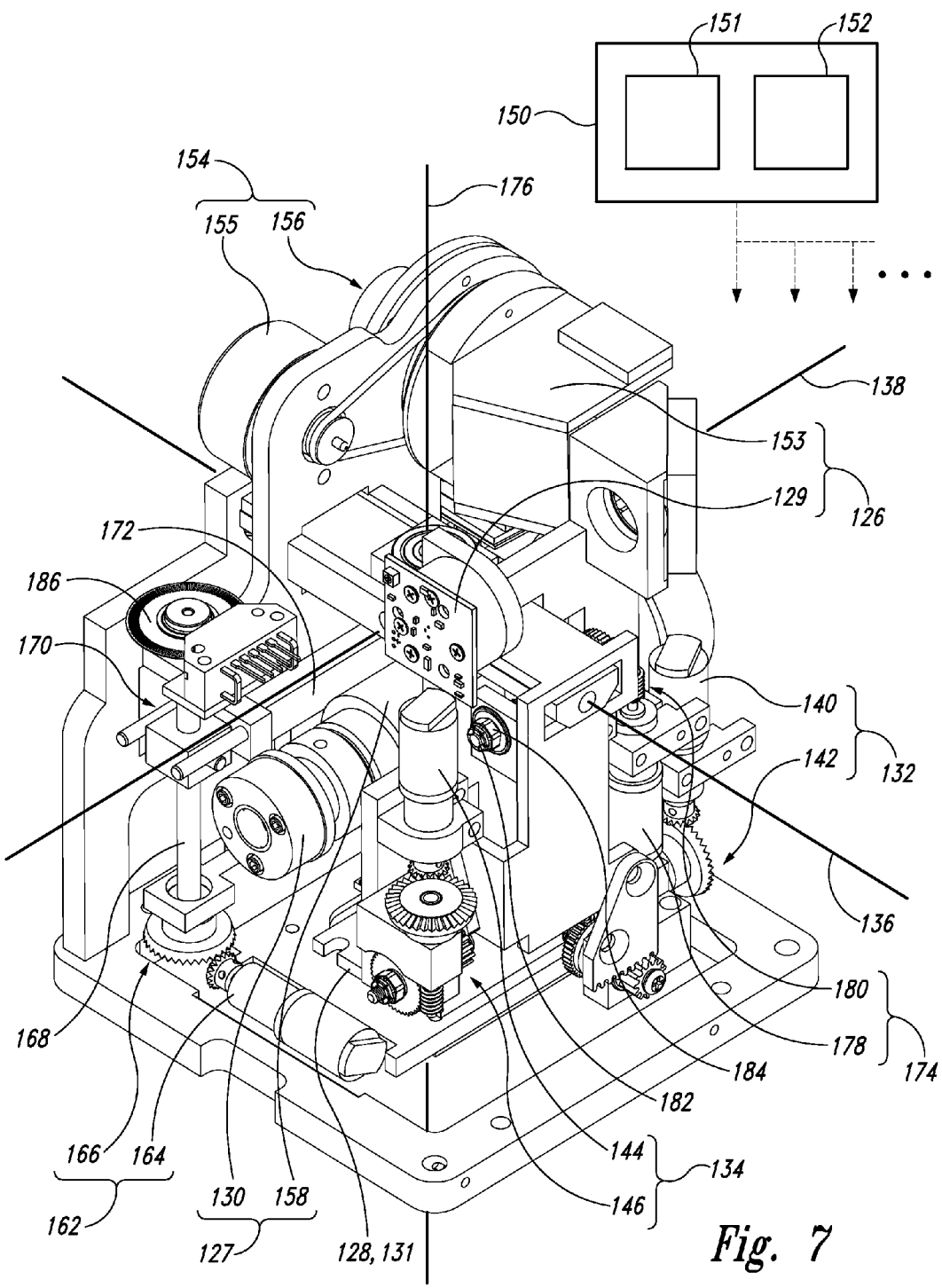
FIG. 7 is a perspective view from the top and one side of an assembly of internal components of the light-emitting device shown in FIG. 1.
Figure 8:
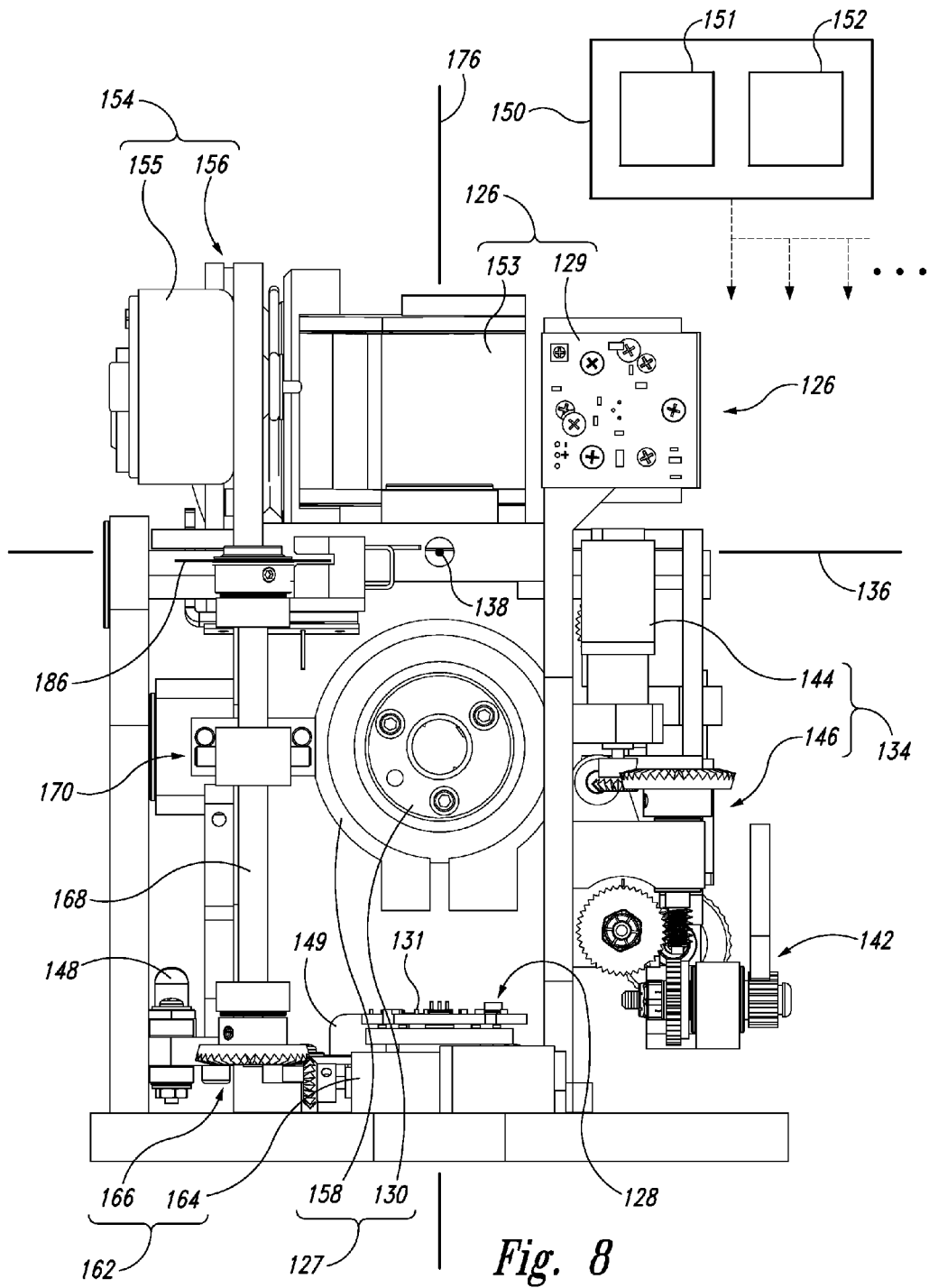
FIG. 8 is a rear profile view of the assembly shown in FIG. 7.

FIG. 7 is a perspective view from the top and one side of an assembly of internal components of the light-emitting device 100. FIG. 8 is a rear profile view of the assembly shown in FIG. 7. Many internal components of the light-emitting device 100 are not shown in FIGS. 7 and 8 for clarity of illustration. With reference to FIGS. 1-8 together, the light-emitting device 100 can include a first light emitter 126, a second light emitter 127, and a third light emitter 128 positioned within the housing 102 and operably connected to the base 106. In the illustrated embodiment, the first light emitter 126, the second light emitter 127, and the third light emitter 128 include a first light source 129 (e.g., including a first laser driver operably connected to one or more first light-emitting diodes), a second light source 130 (e.g., including a second laser driver operably connected to one or more second light-emitting diodes), and a third light source 131 (e.g., including a third laser driver operably connected to one or more third light-emitting diodes), respectively. In other embodiments, some or all of the first, second, and third light emitters 126, 127, 128 can include a shared light source, such as a shared light source including laser driver operably connected to one or more light-emitting diodes and a beam splitter configured to receive light from the one or more light-emitting diodes and to distribute the light to some or all of the first, second, and third light emitters 126, 127, 128.

The first light emitter 126 can be partially or entirely dedicated to maintaining and/or indicating alignment. In contrast, the second light emitter 127 can be partially or entirely dedicated to indicating slope. Accordingly, the first and second light emitters 126, 127 can be configured to emit light having different characteristics (e.g., with respect to shape, intensity, and/or orientation) associated with these different purposes. In one example, the first light emitter 126 is configured to emit a planar light region (not shown) having a vertical orientation and the second light emitter 127 is configured to emit an indicator light beam (not shown) having an adjustable slope. Adjusting the slope of the indicator light beam can change a position of the indicator light beam within a vertical adjustment field. In another example, instead of being configured to emit a planar light region, the first light emitter 126 is configured to emit a scanning light beam having a vertical scanning field. In yet another example, the first light emitter 126 is configured to emit a planar light region and the second light emitter 127 is configured to emit an intersecting planar light region (not shown) perpendicular to the planar light region and having an adjustable slope. The third light emitter 128 can be configured to emit a plummet light beam via the threaded recess 108. The plummet light beam can have a vertical orientation and can be useful for positioning the light-emitting device 100 relative to a reference (e.g., a stake or another suitable marker) in the field. Other types and combinations of light from the first, second, and third light emitters 126, 127, 128 are also possible.

The first, second, and third light emitters 126, 127, 128 can be carried by one or more gimbals. In the illustrated embodiment, the light-emitting device 100 is configured to level the first, second, and third light emitters 126, 127, 128 electronically. For example, the light-emitting device 100 can include an x-axis leveling mechanism 132 configured to rotate the first, second, and third light emitters 126, 127, 128 front-to-back about an x-axis 136. Similarly, the light-emitting device 100 can include a y-axis leveling mechanism 134 configured to rotate the first, second, and third light emitters 126, 127, 128 left-to-right about a y-axis 138. The x-axis leveling mechanism 132 can include a first motor 140 and a first set of motion-transmitting components 142 operably connected to the first motor 140. Similarly, the y-axis leveling mechanism 134 can include a second motor 144 and a second set of motion-transmitting components 146 operably connected to the second motor 144.

The light-emitting device 100 can further include an x-axis level sensor 148, a y-axis level sensor 149, and a controller 150 (shown schematically) operably associated with the x-axis leveling mechanism 132, the y-axis leveling mechanism 134, the x-axis level sensor 148, and the y-axis level sensor 149. The controller 150 can include memory 151 (shown schematically) and processing circuitry 152 (shown schematically). Wires (not shown) or other suitable electrical connectors can operably connect the controller 150 to the x-axis leveling mechanism 132, the y-axis leveling mechanism 134, the x-axis level sensor 148, and the y-axis level sensor 149. The memory 151 can store instructions (e.g., non-transitory instructions) that, when executed by the controller 150 using the processing circuitry 152, cause the x-axis leveling mechanism 132 to level the first, second, and third light emitters 126, 127, 128 based on input from the x-axis level sensor 148. Similarly, the memory 151 can store instructions that, when executed by the controller 150 using the processing circuitry 152, cause the y-axis leveling mechanism 134 to level the first, second, and third light emitters 126, 127, 128 based on input from the y-axis level sensor 149. In other embodiments, the light-emitting device 100 can be configured to level the first, second, and third light emitters 126, 127, 128 in another suitable manner, such as by gravity.

In the illustrated embodiment, the first light emitter 126 includes a reflector 153 (e.g., a pentamirror or a pentaprism) operably connected to a reflector-rotating mechanism 154 configured to rotate the reflector 153 about a horizontal axis parallel to the x-axis 136. The reflector-rotating mechanism 154 can include a third motor 155 and a third set of motion-transmitting components 156 operably connected to the third motor 155. The reflector 153 can be configured to receive light from the first light source 129 and to emit the light away from the light-emitting device 100 via one, some, or all of the windows 118. The speed at which the reflector 153 rotates can determine whether the emitted light forms a planar light region having a vertical orientation or a scanning light beam having a vertical scanning field. In other embodiments, the light-emitting device 100 can include a lens, a filter, or another suitable rotating or non-rotating component configured to convert light from the first light source 129 into a planar light region having a vertical orientation, a scanning light beam having a vertical scanning field, or another suitable form.

The second light emitter 127 can include a cylinder 158 defining a passage (not shown) through which light from the second light source 130 can be transmitted. For example, a first end portion of the passage can be positioned to receive light from the second light source 130. A collimating lens (not shown) disposed within the cylinder 158 at a second end portion of the passage opposite to the first end portion of the passage can be configured to convert the light from the second light source 130 into an indicator light beam. In at least some embodiments in which the second light emitter 127 is configured to emit an intersecting planar light region, the collimating lens can be replaced with a rotatable reflector or another suitable component for generating planar light regions. The angle of at least a portion of the second light emitter 127 can be adjustable to change the slope of an indicator light beam or an intersecting planar light region from the second light emitter 127. For example, the light-emitting device 100 can include a slope-adjusting mechanism 162 configured to rotate the second light emitter 127 about a horizontal axis parallel to the x-axis 136 to change the slope of an indicator light beam or an intersecting planar light region from the second light emitter 127. The slope-adjusting mechanism 162 can include a fourth motor 164 and a fourth set of motion-transmitting components 166 operably connected to the fourth motor 164. In the illustrated embodiment, the fourth set of motion-transmitting components 166 includes a vertical lead screw 168 and a yoke 170 configured to lift and lower one end of an arm 172 having an opposite end operably connected to the cylinder 158 at least proximate to the second end portion of the passage. In other embodiments, the fourth set of motion-transmitting components 166 can have another suitable configuration.

In addition to controlling automatic leveling of the first, second, and third light emitters 126, 127, 128 via the x-axis leveling mechanism 132 and the y-axis leveling mechanism 134, the controller 150 can be configured to control automatic alignment of the first, second, and third light emitters 126, 127, 128. For example, the controller 150 can be configured to receive one or more signals from a remotely positioned detector (not shown) via the antenna 122 and to control automatic alignment of the first, second, and third light emitters 126, 127, 128 based on the one or more signals. Although in the illustrated embodiment the controller 150 is configured to receive the one or more signals wirelessly, in other embodiments, the controller 150 can be configured to receive the one or more signals via a wired connection with the detector. Furthermore, although in the illustrated embodiment the controller 150 is configured to control both automatic leveling and automatic alignment of the first, second, and third light emitters 126, 127, 128, in other embodiments the controller 150 can be configured to control one of automatic leveling and automatic alignment with the other being controlled in another suitable manner.

The light-emitting device 100 can include an alignment-adjusting mechanism 174 configured to rotate the first, second, and third light emitters 126, 127, 128 in concert relative to the base 106 about a vertical axis 176. In this way, the light-emitting device 100 can rotationally reposition a planar light region from the first light emitter 126 or a vertical scanning field of a scanning light beam from the first light emitter 126 in concert with an indicator light beam or an intersecting planar light region from the second light emitter 127. The alignment-adjusting mechanism 174 can include a fifth motor 178 and a fifth set of motion-transmitting components 180 operably connected to the fifth motor 178. In the illustrated embodiment, the fifth set of motion-transmitting components 180 includes a horizontal lead screw 182 extending though a threaded passage (not shown) defined by a rotationally constrained nut 184. In other embodiments, the fifth set of motion-transmitting components 180 can have another suitable configuration.

The controller 150 can be operably associated with the alignment-adjusting mechanism 174. For example, the memory 151 can store instructions (e.g., non-transitory instructions) that, when executed by the controller 150 using the processing circuitry 152, cause the alignment-adjusting mechanism 174 to rotate the first, second, and third light emitters 126, 127, 128 in concert relative to the base 106 about the vertical axis 176 in response to the one or more signals or an absence of the one or more signals from the detector. As further discussed below, the one or more signals or an absence of the one or more signals can indicate a misaligned state of a planar light region from the first light emitter 126 or of a vertical scanning field of a scanning light beam from the first light emitter 126. Thus, based on the one or more signals or an absence of the one or more signals, the controller 150 can be configured to move a planar light region from the first light emitter 126 or a vertical scanning field of a scanning light beam from the first light emitter 126 from a misaligned state toward an aligned state. An indicator light beam or an intersecting planar light region from the second light emitter 127 can move with the planar light region from the first light emitter 126 or with the vertical scanning field of the scanning light beam from the first light emitter 126 such that the indicator light beam or the intersecting planar light region is correspondingly repositioned.

The controller 150 also can be operably associated with the buttons 112 and the display 116. For example, pressing the button 112a can cause the controller 150 to open one or more switches (not shown) and thereby allow electricity from batteries (not shown) within the battery compartment 104 to flow to the first, second, and third light emitters 126, 127, 128. Pressing the button 112e can manually change a slope of an indicator light beam or an intersecting planar light region from the second light emitter 127 to a selected slope. For example, the slope-adjusting mechanism 162 can include an encoder 186 operably connected to the controller 150. The controller 150 can be configured to cause the display 116 to indicate a slope of the second light emitter 127 based one or more signals from the encoder 186. The display 116 can be a touchscreen that allows a user to control additional operations of the light-emitting device 100 and/or other components of the system. Furthermore, instead of or in addition to being positioned on the light-emitting device 100, the buttons 112 and/or the display 116 can be positioned on a remote control (not shown) configured to communicate with the light-emitting device 100 via a wired or wireless connection.

Pressing the button 112c can cause the controller 150 to switch control of the alignment-adjusting mechanism 174 between a manual state (e.g., a calibration state) and an automatic state (e.g., a locked state). In the manual state, the controller 150 can be configured to rotate the first, second, and third light emitters 126, 127, 128 right or left via the alignment-adjusting mechanism 174 in response to pressing the button 112b or the button 112d, respectively. Once a selected alignment is achieved, the button 112c can be pressed to cause the controller 150 to switch control of the alignment-adjusting mechanism 174 to the automatic state. In the automatic state, the controller 150 can be configured to automatically maintain the selected alignment by controlling the alignment-adjusting mechanism 174 based on the one or more signals or an absence of the one or more signals from the detector. For example, in the automatic state, the controller 150 can be configured to make small or large adjustments as needed to maintain the selected alignment. At least some adjustments may occur relatively frequently to compensate for factors (e.g., thermal expansion and contraction of components of the light-emitting device 100) with relatively minor, but persistent effects on alignment. Other adjustments may occur relatively infrequently to compensate for factors (e.g., impact against the light-emitting device 100) with relatively major effects on alignment.

Figure 9:
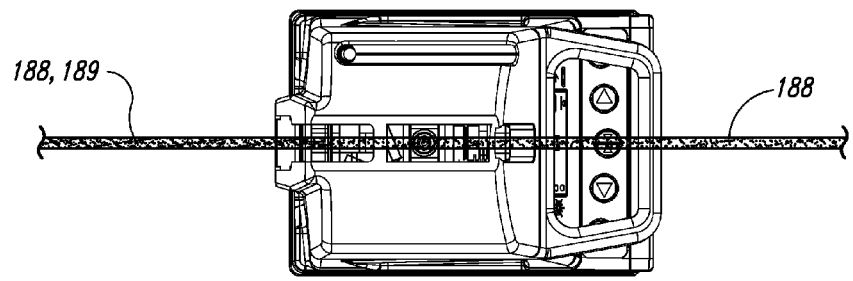
FIGS. 9 and 10 are plan and side profile views, respectively, of the light-emitting device shown in FIG. 1 simultaneously emitting a planar light region and an indicator light beam.
Figure 10:
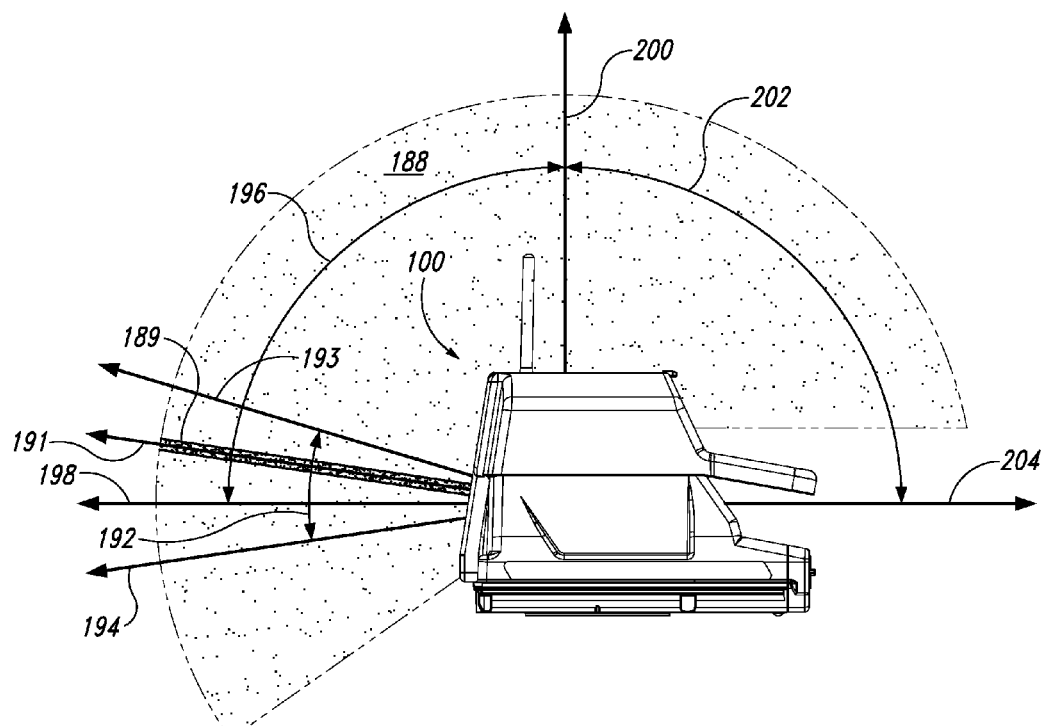
Figure 11:
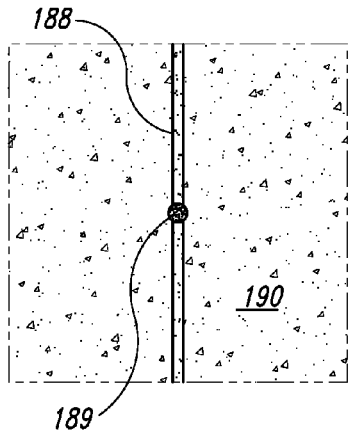
FIG. 11 is a profile view of the planar light region and the indicator light beam shown in FIGS. 9 and 10 projected onto a surface.

FIGS. 9 and 10 are plan and side profile views, respectively, of the light-emitting device 100 simultaneously emitting a planar light region 188 and an indicator light beam 189. FIG. 11 is a profile view of the planar light region 188 and the indicator light beam 189 projected onto a surface 190. The planar light region 188 can have a vertical orientation and the indicator light beam 189 can have an adjustable slope. For example, the indicator light beam 189 can have a radial direction 191 away from the base 106 within a vertical adjustment field (represented by arrow 192) extending from an uppermost radial direction 193 away from the base 106 to a lowermost radial direction 194 away from the base 106. In some embodiments, the uppermost radial direction 193 has an angle within a range from about 10 degrees to about 90 degrees off a horizontal plane and the lowermost radial direction 194 has an angle within a range from about −5 degrees to about −90 degrees off the horizontal plane. In a particular embodiment, the uppermost radial direction 193 has an angle of about 17 degrees off the horizontal plane and the lowermost radial direction 194 has an angle of about −6 degrees off the horizontal plane. In other embodiments, the uppermost and lowermost radial directions 193, 194 can have other suitable positions relative to the horizontal plane.

The vertical adjustment field can at least partially overlap a first vertical arc area (represented by arrow 196) extending from a first horizontal direction 198 away from the base 106 to an upward vertical direction 200 away from the base 106. In some embodiments, the planar light region 188 at least partially overlaps a second vertical arc area (represented by arrow 202) extending from a second horizontal direction 204 away from the base 106 opposite to the first horizontal direction 198 to the upward vertical direction 200. Similarly, when the first light emitter 126 is configured to emit a scanning light beam having a vertical scanning field instead of the planar light region 188, the vertical scanning field can at least partially overlap the second vertical arc area. It can be useful for the planar light region 188 or a vertical scanning field to at least partially overlap the second vertical arc area, for example, to allow the planar light region 188 or the vertical scanning field to interact with a detector positioned behind the light-emitting device 100 rather than in front of the light-emitting device 100. In some cases, positioning a detector behind the light-emitting device 100 rather than in front of the light-emitting device 100 can be advantageous, such as to reduce interference between the detector and an operation (e.g., a tunneling operation) occurring in front of the light-emitting device 100 or when suitable mounting positions for the detector in front of the light-emitting device 100 are less available or desirable than suitable mounting positions for the detector behind the light-emitting device 100.

Figure 12:
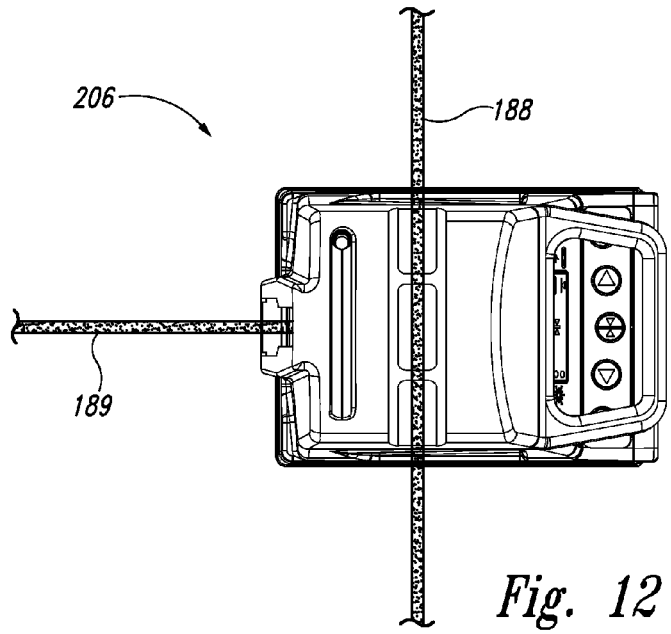
FIG. 12 is a plan view of a light-emitting device of a reference system configured in accordance with an embodiment of the present technology simultaneously emitting a planar light region horizontally offset from an indicator light beam.

In the illustrated embodiment the planar light region 188 is within the same plane as the indicator light beam 189 and the vertical adjustment field. Similarly, when the first light emitter 126 is configured to emit a scanning light beam having a vertical scanning field instead of the planar light region 188, the vertical scanning field can be within the same plane as the indicator light beam 189 and the vertical adjustment field. In other embodiments, at least a portion of the planar light region 188 or a vertical scanning field can be circumferentially offset relative to the vertical adjustment field by a non-zero fixed angle within a horizontal plane. For example, FIG. 12 is a plan view of a light-emitting device 206 in which the row of windows 118 and intervening bridges 120 and internal components associated with emitting the planar light region 188 are rotated 90 degrees about the vertical axis 176 relative to their positions in the light-emitting device 100. Similar to the advantages discussed above with reference to FIGS. 9 and 10 regarding overlapping the second vertical arc area, horizontally offsetting the planar light region 188 or a vertical scanning field relative to the vertical adjustment field can be advantageous, such as to reduce interference between the detector and an operation (e.g., a tunneling operation) occurring in front of the light-emitting device 206 or when suitable mounting positions for the detector in front of the light-emitting device 206 are less available or desirable than suitable mounting positions to the side of the light-emitting device 206 or otherwise horizontally offset from being directly in front of the light-emitting device 206.

Figure 13:
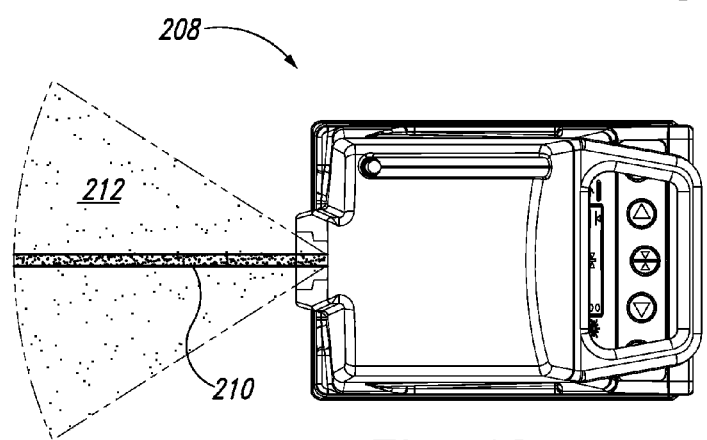
FIGS. 13 and 14 are plan and side profile views, respectively, of a light-emitting device of a reference system configured in accordance with an embodiment of the present technology simultaneously emitting a planar light region and an intersecting planar light region.
Figure 14:
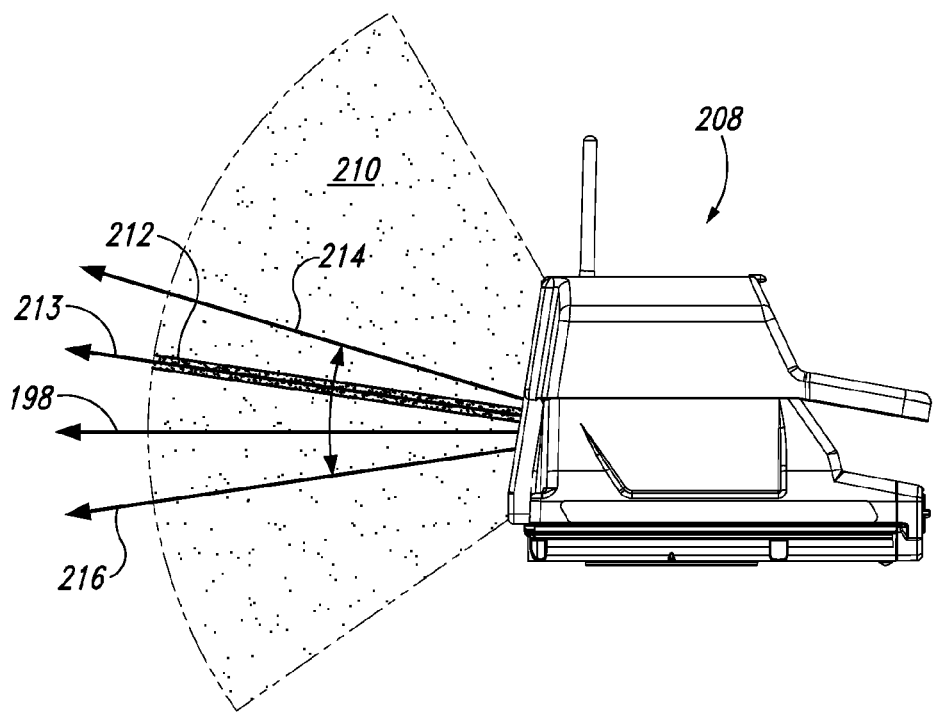

Instead emitting an indicator light beam having an adjustable slope, light-emitting devices of reference systems configured in according with some embodiments of the present technology can emit a planar light region (not shown) that has an adjustable slope and intersects a vertical planar light region. For example, FIGS. 13 and 14 are plan and side profile views, respectively, of a light-emitting device 208 of a reference system configured in accordance with an embodiment of the present technology simultaneously emitting a vertical planar light region 210 and an intersecting planar light region 212. Similar to the indicator light beam 189 shown in FIGS. 9-11, the intersecting planar light region 212 can have a planar radial direction 213 away from the base 106 within the vertical adjustment field (represented by arrow 192) extending from an uppermost planar radial direction 214 away from the base 106 to a lowermost planar radial direction 216 away from the base 106. The angles of the uppermost and lowermost planar radial directions 214, 216 relative to the first horizontal direction 198 can correspond to those of the uppermost and lowermost radial directions 193, 194, respectively.

The planar light region 188 shown in FIGS. 9-11 can be visible or invisible to the naked eye. For example, the planar light region 188 can be intense enough to be detected by a detector, but not intense enough to be visibly located. When a planar light region is only used for maintaining alignment, there is typically no need for it to be visible. For example, a dot, crosshair, or other discrete projection (not shown) of the indicator light beam 189 onto a surface (not shown) can visibly indicate a selected slope at a selected alignment. In contrast, with reference again to FIGS. 13 and 14, the vertical planar light region 210 can be used to visibly indicate alignment and used in conjunction with the intersecting planar light region 212 to visibly indicate slope. The vertical planar light region 210 shown in FIG. 14 extends over a smaller arc than does the planar light region 188 shown in FIG. 10. In some cases, reducing the arc of the vertical planar light region 210 can enhance visibility by allowing for greater light output over a smaller space.

Figure 15:
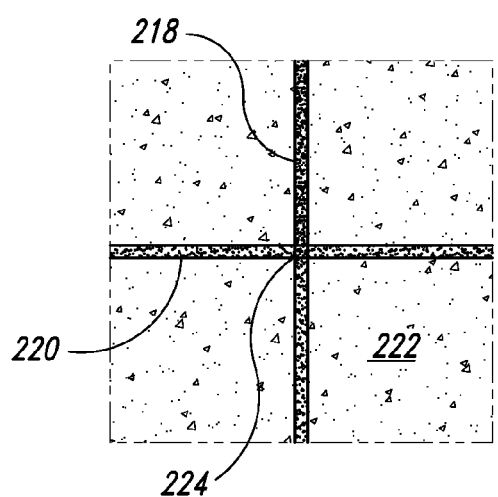
FIG. 15 is a profile view of the planar light region and the intersecting planar light region shown in FIGS. 13 and 14 projected onto a surface.

FIG. 15 is a profile view of a first line 218 corresponding to the vertical planar light region 210 and a second line 220 corresponding to the intersecting planar light region 212 projected onto a surface 222. During use, the first line 218 can visibly indicate a selected alignment, the second line 220 can visibly indicate a selected slope, and an intersection 224 of the first and second lines 218, 220 can indicate the selected slope at the selected alignment. Indicating a selected slope and a selected alignment in this way can be useful, for example, when a vertical line, a horizontal line, or both at the selected slope and alignment are needed as a visible reference for positioning a piece of equipment or for another suitable aspect of an operation occurring at the selected slope and alignment.

Although the second line 220 is shown as a level line in FIG. 15, in other embodiments, the second line 220 can be non-level. For example, the intersecting planar light region 212 can have an adjustable slope in two perpendicular planes. In this way, the intersecting planar light region 212 can visibly or invisibly indicate a compound slope. When the intersecting planar light region 212 is used to indicate a compound slope, the accuracy of the entire plane may depend on the alignment of the light-emitting device 206. The vertical planar light region 210, another visible or invisible vertical planar light region, or a scanning light beam having a vertical scanning field can be emitted from the light-emitting device 206 to maintain this alignment. Planar light regions indicating compound slopes can be useful, for example, in earthwork applications calling for complex topography, among other examples.

Figure 16:
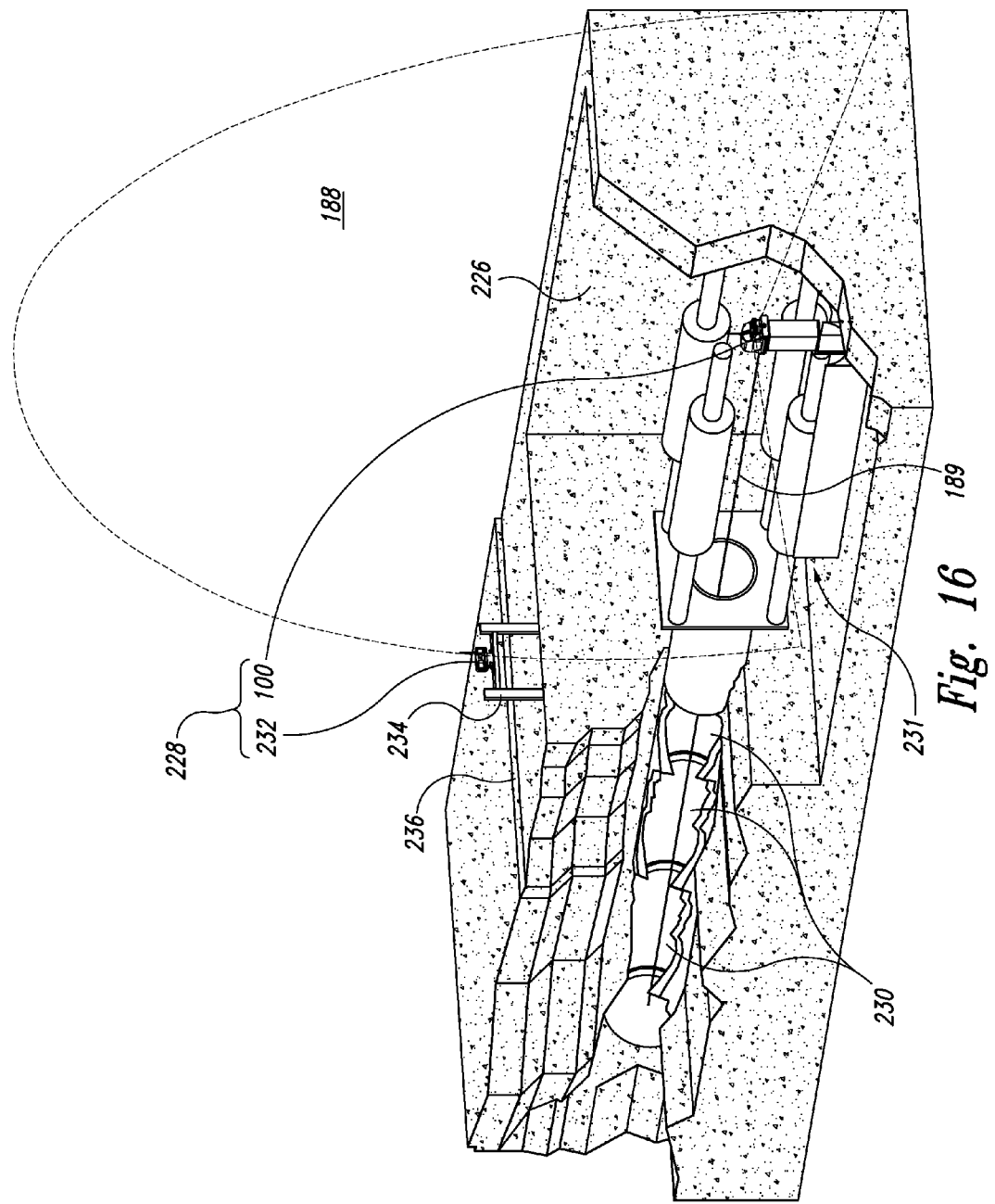
FIG. 16 is a perspective cut-away view from the top and one side of a subterranean pit in which a reference system configured in accordance with an embodiment of the present technology is guiding installation of pipe sections.

FIG. 16 is a perspective cut-away view from the top and one side of a subterranean pit 226 in which a reference system 228 configured in accordance with an embodiment of the present technology is guiding installation of pipe sections 230 using a pipe-ramming assembly 231. The reference system 228 includes the light-emitting device 100 and a detector 232 attached to a mount 234 positioned at an upper rim 236 of the subterranean pit 226. After setup, the detector 232 can receive the planar light region 188 and to detect its presence and/or position (e.g., via optical transducers positioned behind a detection window). When the detected presence and/or position of the planar light region 188 is accurate and does not change, the detector 232 can be configured to transmit (e.g., wirelessly transmit) one or more signals indicating an aligned state of the planar light region 188. When the detected presence and/or position of the planar light region 188 changes, the detector 232 can be configured to stop transmitting the one or more signals so as to indicate a misaligned state of the planar light region 188. Alternatively, when the detected presence and/or position of the planar light region 188 changes, the detector 232 can be configured to start transmitting one or more signals so as to indicate a misaligned state of the planar light region 188 and when the detected presence and/or position of the planar light region 188 is accurate and does not change, the detector 232 can be configured to stop transmitting the one or more signals so as to indicate a misaligned state of the planar light region 188. In some embodiments, the detector 232 is configured to emit one or more signals indicating a direction of misalignment of the planar light region 188, such as a shift to the left or a shift to the right. In other embodiments, the detector 232 can be configured to only emit one or more signals that do not indicate a direction of misalignment of the planar light region 188.

The light-emitting device 100 can be configured to receive one or more signals from the detector 232 and to adjust the position of the planar light region 188 accordingly. For example, the controller 150 shown in FIGS. 7 and 8 can be operably connected to the detector 232 via a wired or wireless connection and the memory 151 of the controller 150 can store instructions that, when executed by the controller 150 using the processing circuitry 152 of the controller 150, cause the alignment-adjusting mechanism 174 to rotationally reposition the planar light region 188 so as to move the planar light region 188 from the misaligned state toward an aligned state. When the detector 232 emits one or more signals indicating a misaligned state of the planar light region 188 without indicating a direction of the misalignment, the light-emitting device 100 can be configured to dither or otherwise suitably rotationally reposition the planar light region 188 until the detector 232 stops emitting the one or more signals and/or starts emitting one or more signals indicating an aligned state of the planar light region 188. As another example, when the detector 232 emits one or more signals indicating a misaligned state of the planar light region 188 without indicating a direction of the misalignment, the light-emitting device 100 can be configured to purposefully rotationally reposition of the planar light region 188 until the detector 232 stops emitting the one or more signals and/or starts emitting one or more signals indicating an aligned state of the planar light region 188. Although the planar light region 188 is shown in FIG. 16, the same or similar functionality can alternatively be achieved with a scanning light beam having a vertical scanning field.

Figure 17:
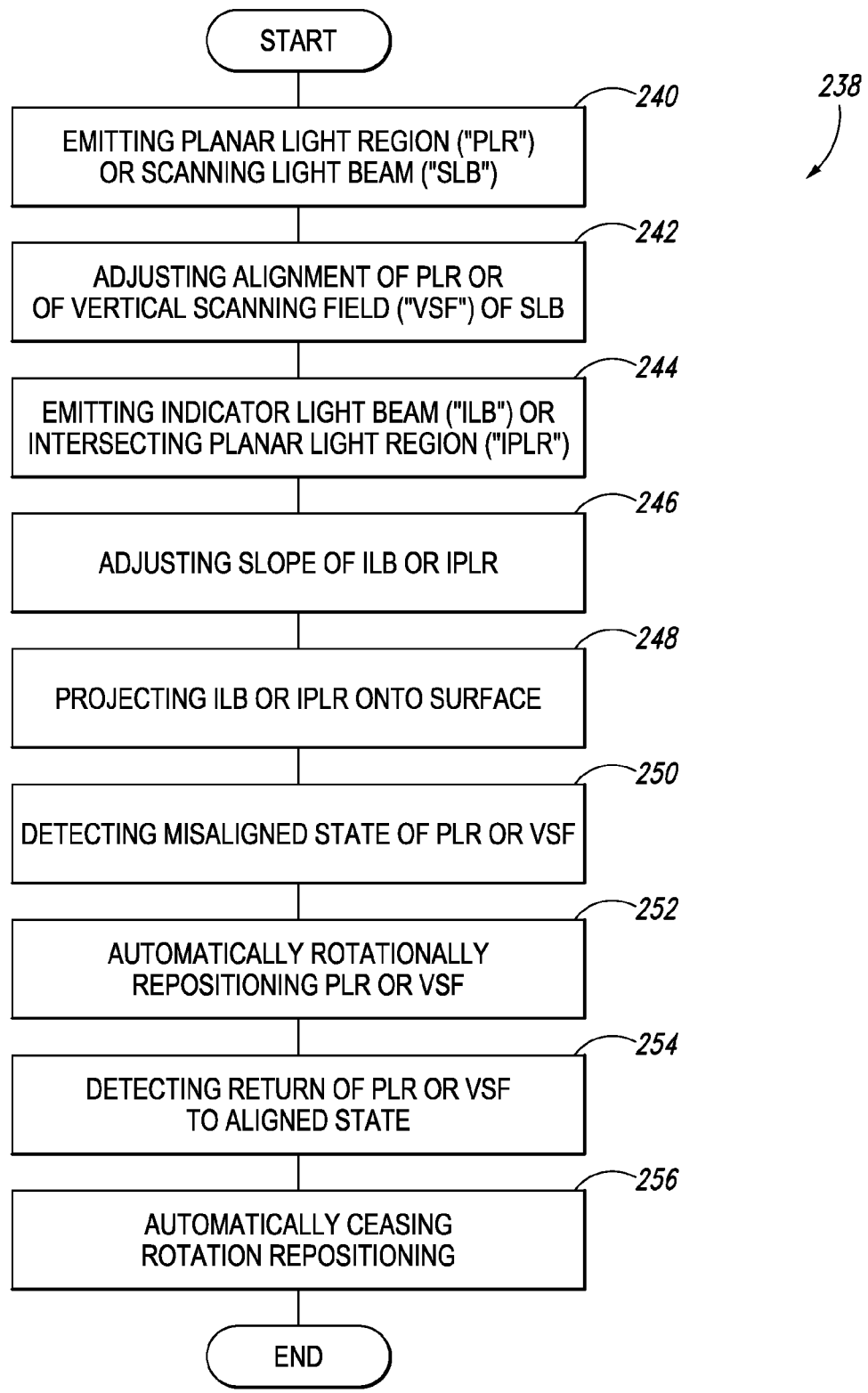
FIG. 17 is a flow chart illustrating a method for indicating slope and alignment in accordance with an embodiment of the present technology.

FIG. 17 is a flow chart illustrating a method 238 for indicating slope and alignment in accordance with an embodiment of the present technology. With reference to FIGS. 9-11 and 14-17 together, the method 238 can include emitting the planar light region 188, 210 or a scanning light beam using the first light emitter 126 (block 240). The method 238 can further include adjusting an alignment of the planar light region 188, 210 or of a vertical scanning field of the vertical scanning beam to move the planar light region 188, 210 or the vertical scanning field, respectively, to an aligned state (block 242). The method 238 can further include emitting the indicator light beam 189 or the intersecting planar light region 212 using the second light emitter 127 (block 244). The method 238 can further include adjusting a slope of the indicator light beam 189 or of the intersecting planar light region 212 to move the indicator light beam 189 or the intersecting planar light region 212, respectively, to a selected slope (block 246). The method 238 can further include projecting a dot corresponding to the indicator light beam 189 or projecting a line corresponding to the intersecting planar light region 212 onto a surface (e.g., a working surface or the surface of a field receiver) to indicate the selected alignment and the selected slope (block 248).

The method 238 can further include detecting a misaligned state of the planar light region 188, 210 or of the vertical scanning field using the detector 232 after the planar light region 188 or the vertical scanning field moves to the aligned state (block 250). The method 238 can further include automatically rotationally repositioning the planar light region 188, 210 or the vertical scanning field about the vertical axis 176 after detecting the misaligned state (block 252). When the indicator light beam 189 is used to indicate the selected slope and alignment, the indicator light beam 189 can be automatically rotationally repositioned in concert (e.g., equal in degree, direction, and time, equal in degree and direction, or coordinated in another suitable manner) with the planar light region 188, 210. When the intersection 224 of the planar light region 188, 210 and the intersecting planar light region 212 is used to indicate the selected slope and alignment, the intersecting planar light region 212 may be automatically rotationally repositioned in concert with the planar light region 188, 210 or may remain stationary. The method 238 can further include detecting a return of the planar light region 188, 210 or vertical scanning field to the aligned state (block 254). The method 238 can further include automatically ceasing the rotational repositioning after detecting the return of the planar light region 188, 210 or of the vertical scanning field to the aligned state (block 256). The method 238 can also include other suitable operations. As an example, the method 238 can include automatically leveling the first and second light emitters 126, 127.

CONCLUSION

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may have been disclosed in the context of those embodiments, other embodiments can also exhibit such advantages, and not all embodiments need necessarily exhibit such advantages or other advantages disclosed herein to fall within the scope of the present technology. Accordingly, this disclosure and associated technology can encompass other embodiments not expressly shown or described herein.

Certain aspects of the present technology may take the form of computer-executable instructions, including routines executed by a controller or other data processor. In at least some embodiments, a controller or other data processor is specifically programmed, configured, and/or constructed to perform one or more of these computer-executable instructions. Furthermore, some aspects of the present technology may take the form of data (e.g., non-transitory data) stored or distributed on computer-readable media, including magnetic or optically readable and/or removable computer discs as well as media distributed electronically over networks. Accordingly, data structures and transmissions of data particular to aspects of the present technology are encompassed within the scope of the present technology. The present technology also encompasses methods of both programming computer-readable media to perform particular steps and executing the steps.

The methods disclosed herein include and encompass, in addition to methods of practicing the present technology (e.g., methods of making and using the disclosed devices and systems), methods of instructing others to practice the present technology. For example, a method in accordance with a particular embodiment includes emitting a planar light region from a light-emitting device, adjusting an alignment of the planar light region to move the planar light region to an aligned state, emitting an indicator light beam from the light-emitting device, adjusting a slope of the indicator light beam to move the indicator light beam to a selected slope, detecting a misaligned state of the planar light region using a detector after the planar light region moves to the aligned state, automatically rotationally repositioning the planar light region in concert with the indicator light beam about a vertical axis after detecting the misaligned state, detecting a return of the planar light region to the aligned state, and automatically ceasing the rotational repositioning after detecting the return of the planar light region to the aligned state. A method in accordance with another embodiment includes instructing such a method.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like are used throughout this disclosure to mean including at least the recited feature(s) such that any greater number of the same feature(s) and/or one or more additional types of features are not precluded. Directional terms, such as "upper," "lower," "front," "back," "vertical," and "horizontal," may be used herein to express and clarify the relationship between various elements. It should be understood that such terms do not denote absolute orientation. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

We claim:

1. A reference system, comprising:
   a light-emitting device locatable at a first location, the light-emitting device including—
      a first light emitter configured to emit a planar light region having a vertical orientation,
      a second light emitter configured to emit an indicator light beam, a slope of the indicator light beam being adjustable to change a position of the indicator light beam within a vertical adjustment field,
      a housing including a base operably connected to the first and second light emitters, and
      an alignment-adjusting mechanism configured to rotate the first and second light emitters in concert relative to the base about a vertical axis so as to rotationally reposition the planar light region and the indicator light beam;
   a detector locatable at a second location remote from the first location, the first and second locations being situated such that the planar light region is incident on the detector when the planar light region is in an aligned state, the light-emitting device is at the first location, and the detector is at the second location; and
   a controller operably associated with the alignment-adjusting mechanism and the detector,
   wherein—
      the controller is configured to wirelessly receive one or more signals from the detector,
      the detector is configured to detect a misaligned state of the planar light region based on a shift of the planar light region from the aligned state and to wirelessly transmit or stop wirelessly transmitting the one or more signals to the controller in response to detecting the misaligned state, and
      the controller includes memory and processing circuitry, the memory storing instructions that, when executed by the controller using the processing circuitry, cause the alignment-adjusting mechanism to rotate the first and second light emitters in concert relative to the base about the vertical axis in response to the one or more signals or an absence of the one or more signals so as to move the planar light region from the misaligned state toward the aligned state and to correspondingly reposition the indicator light beam.

2. The reference system of claim 1 wherein at least a portion of the vertical adjustment field overlaps the planar light region.

3. The reference system of claim 1 wherein the vertical adjustment field extends from an uppermost radial direction away from the base to a lowermost radial direction away from the base, the uppermost radial direction having an angle within a range from about 10 degrees to about 90 degrees off a horizontal plane, the lowermost radial direction having an angle within a range from about −5 degrees to about −90 degrees off the horizontal plane.

4. The reference system of claim 1 wherein:
   the vertical adjustment field at least partially overlaps a first vertical arc area extending from a first horizontal direction away from the base to an upward vertical direction away from the base; and
   the planar light region at least partially overlaps a second vertical arc area extending from a second horizontal direction away from the base to the upward vertical direction, the second horizontal direction being opposite to the first horizontal direction.

5. The reference system of claim 1 wherein at least a portion of the vertical adjustment field is circumferentially offset relative to the planar light region by a non-zero fixed angle within a horizontal plane.

6. The reference system of claim 1 wherein the light-emitting device includes a third light emitter configured to emit a plummet light beam having a vertical orientation.

7. A reference system, comprising:
   a light-emitting device locatable at a first location, the light-emitting device including—
      a first light emitter configured to emit a scanning light beam having a vertical scanning field,
      a second light emitter configured to emit an indicator light beam, a slope of the indicator light beam being adjustable to change a position of the indicator light beam within a vertical adjustment field, a housing including a base operably connected to the first and second light emitters, and an alignment-adjusting mechanism configured to rotate the first and second light emitters in concert relative to the base about a vertical axis so as to rotationally reposition the vertical scanning field and the indicator light beam;

a detector locatable at a second location remote from the first location, the first and second locations being situated such that the vertical scanning field is incident on the detector when the vertical scanning field is in an aligned state, the light-emitting device is at the first location, and the detector is at the second location; and a controller operably associated with the alignment-adjusting mechanism and the detector, wherein— the controller is configured to wirelessly receive one or more signals from the detector, the detector is configured to detect a misaligned state of the vertical scanning field based on a shift of the vertical scanning field from the aligned state and to wirelessly transmit or stop wirelessly transmitting the one or more signals to the controller in response to detecting the misaligned state, and the controller includes memory and processing circuitry, the memory storing instructions that, when executed by the controller using the processing circuitry, cause the alignment-adjusting mechanism to rotate the first and second light emitters in concert relative to the base about the vertical axis in response to the one or more signals or an absence of the one or more signals so as to move the vertical scanning field from the misaligned state toward the aligned state and to correspondingly reposition the indicator light beam.

8. The reference system of claim 7 wherein at least a portion of the vertical adjustment field overlaps the vertical scanning field.

9. The reference system of claim 7 wherein the vertical adjustment field extends from an uppermost radial direction away from the base to a lowermost radial direction away from the base, the uppermost radial direction having an angle within a range from about 10 degrees to about 90 degrees off a horizontal plane, the lowermost radial direction having an angle within a range from about −5 degrees to about −90 degrees off the horizontal plane.

10. The reference system of claim 7 wherein:

the vertical adjustment field at least partially overlaps a first vertical arc area extending from a first horizontal direction away from the base to an upward vertical direction away from the base; and the vertical scanning field at least partially overlaps a second vertical arc area extending from a second horizontal direction away from the base to the upward vertical direction, the second horizontal direction being opposite to the first horizontal direction.

11. The reference system of claim 7 wherein at least a portion of the vertical adjustment field is circumferentially offset relative to the vertical scanning field by a non-zero fixed angle within a horizontal plane.

12. The reference system of claim 7 wherein the light-emitting device includes a third light emitter configured to emit a plummet light beam having a vertical orientation.

13. A reference system, comprising:

a light-emitting device locatable at a first location, the light-emitting device including— a first light emitter configured to emit a first planar light region having a vertical orientation, a second light emitter configured to emit a second planar light region, a slope of the second planar light region being adjustable, the second planar light region being perpendicular to and intersecting the first planar light region, a housing including a base operably connected to the first and second light emitters, and an alignment-adjusting mechanism configured to rotate the first light emitter relative to the base about a vertical axis so as to rotationally reposition the first planar light region;

a detector locatable at a second location remote from the first location, the first and second locations being situated such that the first planar light region is incident on the detector when the first planar light region is in an aligned state, the light-emitting device is at the first location, and the detector is at the second location; and a controller operably associated with the alignment-adjusting mechanism and the detector, wherein— the controller is configured to wirelessly receive one or more signals from the detector, the detector is configured to detect a misaligned state of the first planar light region based on a shift of the first planar light region from the aligned state and to wirelessly transmit or stop wirelessly transmitting the one or more signals to the controller in response to detecting the misaligned state, and the controller includes memory and processing circuitry, the memory storing instructions that, when executed by the controller using the processing circuitry, cause the alignment-adjusting mechanism to rotate the first light emitter relative to the base about the vertical axis in response to the one or more signals or an absence of the one or more signals so as to move the first planar light region from the misaligned state toward the aligned state.

14. The reference system of claim 13 wherein the second planar light region is adjustable within a range from an uppermost radial direction away from the base to a lowermost radial direction away from the base, the uppermost radial direction having an angle within a range from about 10 degrees to about 90 degrees off a horizontal plane, the lowermost radial direction having an angle within a range from about −5 degrees to about −90 degrees off the horizontal plane.

15. The reference system of claim 13 wherein the light-emitting device includes a third light emitter configured to emit a plummet light beam having a vertical orientation.

* * * * *